United States Patent Office 2,960,176
Patented Nov. 15, 1960

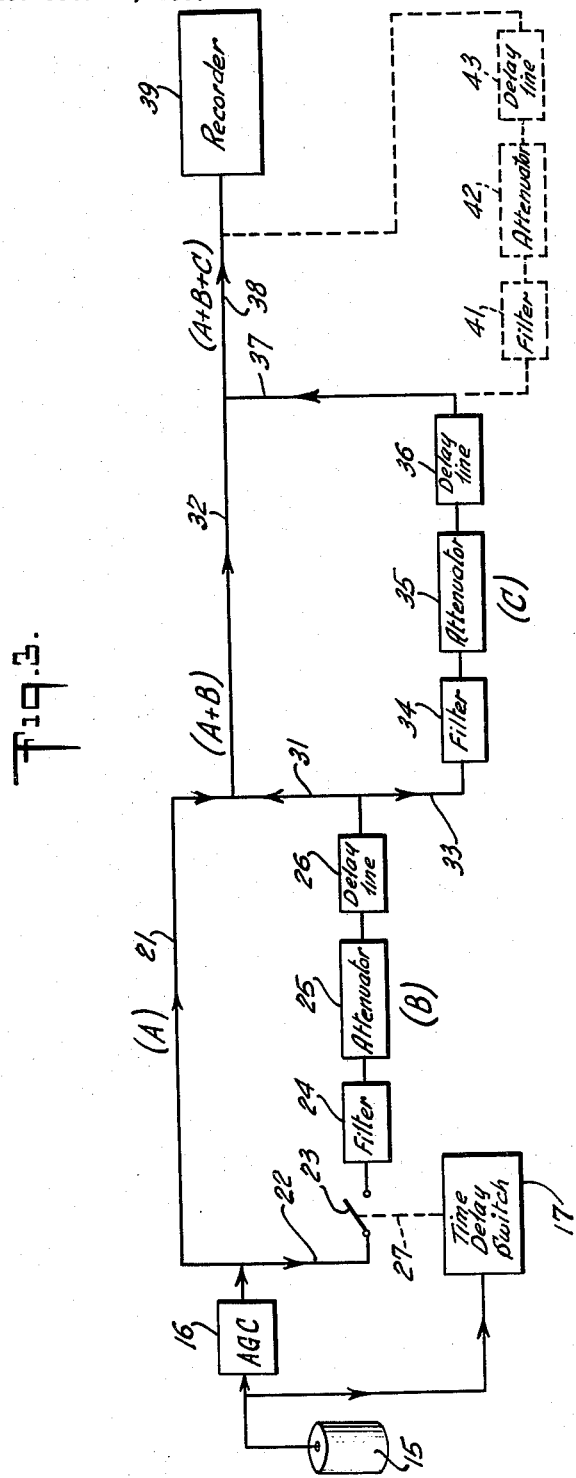

2,960,176
APPARATUS RELATED TO SEISMIC EXPLORATION

Alvin L. Parrack, Bellaire, Tex., assignor to Texaco Inc., a corporation of Delaware Filed Oct. 16, 1957, Ser. No. 690,562

1 Claim. (Cl. 181—.5)

This invention is concerned with seismic exploration in general, and more specifically with apparatus for eliminating the effects of a "following," or "ghost" wave.

In reflection type seismic exploration that is carried out while employing a high-explosive charge to generate the seismic energy, it is most common to detonate such a charge beneath the surface of the earth at a distance sufficient that the detonation takes place within the sub-surface formations of the earth, i.e., where the density is such that the propagation of seismic energy takes place at a relatively high velocity and with good propagation. The seismic energy that is generated by such a detonation travels outwardly from the point of detonation in all directions. For this reason there is created, in addition to a desired downward traveling wave, a secondary, or following wave which is the product of the energy that traveled upward from the detonation and then was reflected back down again from the surface (or the bottom of the weathered layer). Such following wave is harmful with respect to the interpretation of the results in determining the presence of reflecting sub-surface layers. This is so because the "following" wave adds an additional seismic signal that tends to confuse the signals as they are received by a transducer at the surface of the earth. Furthermore, the "following" wave may exist in an overlapping manner with the direct wave that has traveled only from the detonated charge downward to a reflecting surface and back up to the transducer.

Consequently, it is an object of this invention to overcome the difficulties indicated above in connection with the following wave that exists in conjunction with reflection seismic prospecting.

Another object of this invention is to disclose apparatus for substantially eliminating the effects of the following wave as it exists upon detection at the surface of the earth.

Briefly, the invention is concerned with seismic exploration, and relates to apparatus for eliminating the effects of a following wave coming later in time than a direct wave emanating from the same source. The invention comprises filtering and attenuating said direct wave to create a third wave having substantially the same shape and amplitude as said following wave. The invention also comprises delaying said third wave for a time duration equal to the time between the commencement of said direct and following waves, and applying said third wave in opposition to said following wave to cancel out the effects thereof, leaving said direct wave unobscured.

The above and other objects and benefits of the invention will appear more fully below, and in connection with the specification which is illustrated in the drawings, in which:

Fig. 3 is a block diagram illustrating one arrangement of elements which might be employed for carrying out the invention.

Figure 1:
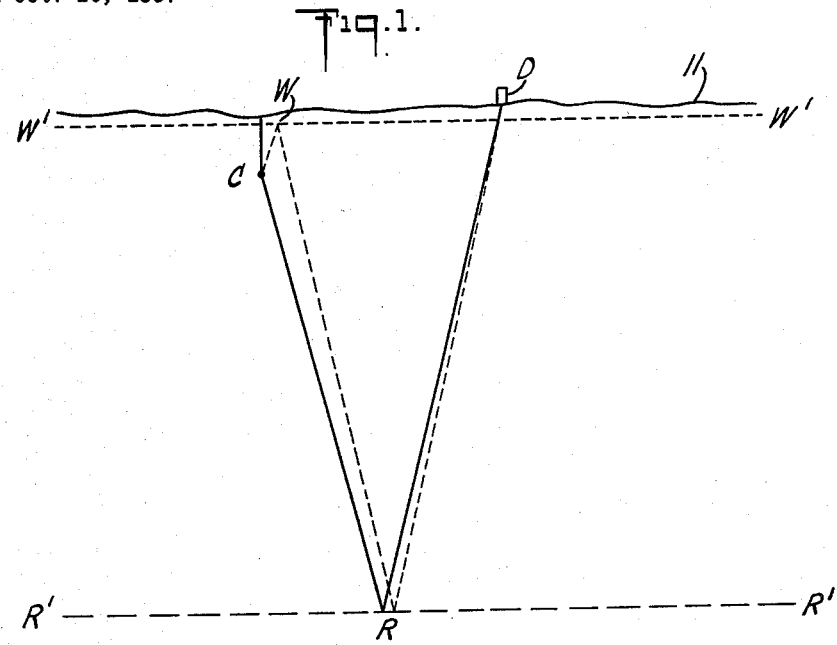
Fig. 1 is a schematic diagram taken as a cross-section of a bit of the earth's surface, and illustrating the paths of travel of seismic waves.

Referring to Fig. 1, it is pointed out that this invention is concerned with a method useful in connection with reflection seismic exploration, wherein there is employed the detonation of a high-explosive charge C which would be located beneath the surface 11 of the earth, as indicated in the diagram of Fig. 1. Such charge C is located some distance beneath an upper reflecting horizon, such as the weathered layer indicated in Fig. 1 by the dashed line $W^1$—$W^1$.

Of major importance are seismic wave indications that have been reflected from sub-surface layers, e.g., a horizon indicated in Fig. 1 as $R^1$—$R^1$. The presence of this energy is determined at or near the surface 11 of the earth by means of a seismic transducer or detector D. Of course more than one such detector will usually be employed, but reflection seismic techniques are generally well-known so that no further reference to the details thereof need be given here. It will be clear to anyone skilled in the art that this invention is described in terms of a single channel of seismic information only.

It is to be noted that whenever the high explosive charge is detonated, there are two paths of travel for the seismic energy that is propagated, or emanates from the location of the charge C, that are of interest in this disclosure. These two paths are indicated in Fig. 1 by the solid and dotted lines respectively. The solid line path C, R, D is the path of travel for a direct reflected wave. While the dotted line C, W, R, D is the path of travel for a "following" or "ghost" wave that is created by reason of the energy which travels upward from the charge and is reflected back down from the surface of the weathered layer.

It is to be noted that the coefficient of reflection of the surface (or weathered layer) is negative, so that the "following" wave becomes reversed in phase relative to the direct wave, just described above. This "ghost" or "following" wave is undesirable since it adds confusion to the waves being received at the detector. Furthermore, the following wave may overlap the direct wave, and the more complete the overlap the more the direct wave will be obscured. Also the following wave may at times overlap the direct wave of another reflector which may exist close to and below the reflector shown in Figure 1 thereby creating confusion when one attempts to interpret the direct wave from the deeper reflector, even though the following wave should not overlap its own direct wave.

Figure 2:
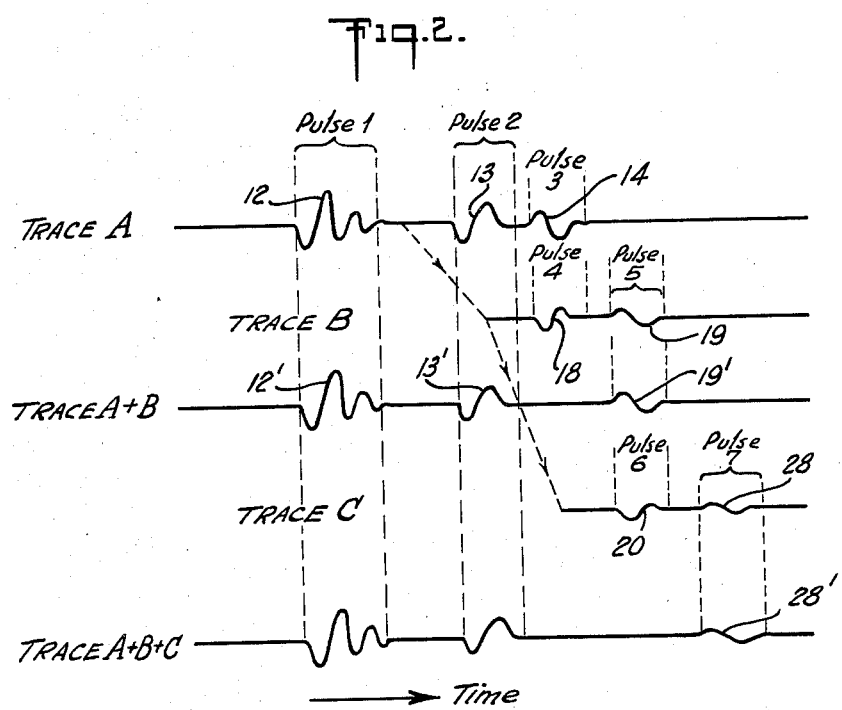
Fig. 2 is an idealized diagram showing representative traces illustrating the seismic waves after transformation by the transducer and at various stages throughout the process.

Apparatus for eliminating the effects of the following wave (in reflection seismic operations or other similar fields) in accordance with this invention, is best described in connection with the illustration of Fig. 2. In Fig. 2, there is shown a trace A which represents, in an idealized manner, the seismic energy waves that are received by the detector D illustrated in Fig. 1 (after automatic gain control has been applied).

It is pointed out that the direct wave and its following wave (as described above) are shown in Fig. 2 as spaced apart considerably. This is done merely for clarity of the description, and it will be understood that the principles are the same whatever the spacing involved.

It will be noted that there is a wave 12, marked pulse 1 in Fig. 2, which represents the seismic wave that first reaches the transducer or detector D. This is the wave commonly known as the P-wave. Then after an interval of time, the next wave 13 that is illustrated, is indicated as being pulse 2. This pulse, or wave 13, represents the direct reflected wave which has reached detector D over a direct path from the charge to the reflecting surface and back, e.g., path C, R, D of Fig. 1. Finally, there is illustrated a third wave 14, marked pulse 3, which is somewhat lesser in amplitude and has a more stretched-out shape by reason of the further travel through the earth. This wave 14 represents the following wave which has arrived at the detector D traveling over a path including the distance up to the surface reflecting layer and back in addition to the direct path, e.g., the path indicated by the dotted line C, W, R, D of Fig. 1.

It will be noted that wave 14 is reversed in phase relative to wave 13, as well as being somewhat different in shape. This is because of the negative coefficient of reflection at the surface, as mentioned above, and on account of the higher frequency components having been additionally attenuated by the greater distance of travel through the earth.

Trace B illustrates waves 18 and 19 that have been derived from waves 13 and 14 respectively. It will be noted that in Fig. 2, trace B is shown vertically aligned beneath trace A, such that wave 18 is in line with wave 14. Furthermore, it is to be noted that (as indicated by the oblique dashed line) trace B is derived from trace A, beginning with a point between wave 12 and wave 13. Now it is pointed out that by adding trace A with trace B, in an algebraic manner, the resulting trace $A+B$ will contain a wave $12^1$ (pulse 1) and a wave $13^1$ (pulse 2), but will have no following wave, e.g., wave 14, although a wave $19^1$ will now be included.

With the above diagrammatic explanation, it will be appreciated that the apparatus of this invention as so far described, includes means to carry out the following steps: beginning with a direct reflected wave and its following wave, (1) filtering this direct wave to change its shape so as to match that of its following wave, (2) attenuating the amplitude of the direct wave so as to make it substantially equal the amplitude of the following wave, and (3) delaying it in time for a period equal to the time between the commencement of the direct wave and the commencement of its following wave. Finally, (4) applying the resulting wave in opposition to the following wave to cancel out the latter, e.g., by algebraically adding them together. When these steps have been carried out, the waves illustrated on trace $A+B$ will result.

After the above-described steps have been carried out, there still remains a wave which has not been canceled, i.e., the wave $19^1$ found on trace $A+B$. However, by repeating the same steps again, but beginning with the waves 18 and 19, a new wave 20 followed by wave 28, may be formed so as to match the shape of the wave $19^1$ in amplitude and frequency components. Then by delaying additionally the occurrence of waves 20 and 28 relative to waves 18 and 19, the resulting wave 20 will be applied in opposition to wave $19^1$ to cancel out the latter, e.g., by adding them algebraically. Thus a combined signal such as that illustrated by trace $A+B+C$ will result.

It is pointed out that by thus making two complete combining procedures, the first "following" wave and in addition the newly created lesser following wave, will be both eliminated, and the only undesired wave remaining will be a relatively low amplitude and low frequency pulse as illustrated by wave 28' in Fig. 2. It will be appreciated also, that the method could be carried out for additional complete combining procedures as desired, in order to cancel wave 28' and other remaining waves (not shown) and leave only a still lesser wave (not shown), which would be of little consequence. The determination as to how far to carry the process of eliminating undesired remaining waves, will depend upon the economic considerations as well as the amplitudes which are disturbing to the final results.

It is pointed out that in the description set forth above, the "following" wave has a phase opposite to that of its direct wave that precedes it, on account of the fact that most surface reflection layers will have a negative coefficient of reflection. However, the invention could be practiced equally well if the coefficient were positive; by merely inverting the direct wave, along with the filtering, attenuating and delaying thereof. Consequently such a step will be understood in the event of a positive coefficient.

Referring to Fig. 3, it is pointed out that there is here illustrated one arrangement of apparatus which might be employed to carry out the steps of this invention. Many other and different arrangements and combinations of elements for carrying out the invention will suggest themselves to anyone skilled in the art.

There is shown a transducer or detector 15 which is the source of electric waves corresponding to the seismic wave energy, e.g., as picked up at location D in the Fig. 1 illustration. The signals generated by detector 15 will be transferred into an automatic gain control circuit 16. At the same time these signals are fed to a time delay switch control circuit 17.

Automatic gain control circuit 16 may take various forms, and preferably is one of the types well known in the art of reflection seismic exploration, wherein the variation in amplitude of the received seismic energy is held relatively constant in order to facilitate the making of a record thereof. The purpose for the time delay circuit 17 will appear more fully below. However, the details of this circuit form no part, per se, of the invention and any feasible type of elements and circuit arrangement may be employed.

Output signals from the automatic gain control circuit 16 are carried simultaneously over two paths, as indicated. One is a direct path 21 that carried the signals comparable to trace A, as indicated by the letter (A) on the drawing. The other path is indicated as a path 22 which leads to a switch 23 that is normally open when not actuated. From the other side of the switch 23, the path continues to a filter 24. The path then continues to an attenuator 25 and from there to a delay line 26.

The filter 24, attenuator 25 and delay line 26 are conventional electronic elements which might take various different forms for accomplishing the desired results. The circuits for these elements are not part of this invention per se, and thus will not be illustrated.

It will be noted that the time delay circuit 17 actuates switch 23, as indicated by a dashed line 27.

The output signals from the delay line 26 are carried over two paths simultaneously. One path is represented by a line 31 that illustrates the fact that these signals are added directly with the signals that are being transmitted over the path 21. Thus a new path 32 carried the algebraically combined signals, e.g., the idealized trace which is pictorially represented in Fig. 2 by the trace $A+B$.

At the same time, the signals from delay line 26 are carried over a path 33 to another filter 34 and then from the output thereof to an attenuator 35, and after that to a delay line 36. The output signals from delay line 36 are carried over a path 37 to join with the signals existing on path 32 so that, after an algebraic combination of these signals, the combined total will be carried over a path 38 that carried the combined signals; e.g., which are illustrated as having the idealized form as represented by the trace $A+B+C$ of Fig. 2. The combined signals may then be carried to a recorder 39 for transforming them into an observable form, such as by employing an oscillograph in the usual manner as employed in seismic exploration operations.

It will be noted that the block diagram of Fig. 3 is not a circuit showing in any sense. For example the output of delay line 26 will have to be separated, of course, when the electrical circuits are considered; because the input of filter 34 must not include any of the signals being carried on path 21 (illustrated by trace A).

It will be observed that with the above-described schematically illustrated apparatus, the process according to the illustrations of Fig. 2 may be carried out. However, if it should be desired to employ one or more additional operations of delaying and canceling the remaining signals, e.g. wave $28^1$, it would involve the use of additional sets of elements such as the filter, attenuator and delay line elements 41, 42 and 43 indicated in Fig. 3 in dashed lines.

The various steps of a method that may be carried out with apparatus according to this invention may be followed with reference to Fig. 3 in the following manner:

Signals generated by detector 15 are transmitted via AGC circuit 16 to a direct transmission path 21 and simultaneously to a path 22 that includes the switch 23. At the same time, the same output signals from detector 15 are carried to a control element in the time delay switch 17, so that upon the arrival of the first energy or P-wave (illustrated as wave 12 in Fig. 2), the internal controls of the time delay circuit 17 will be set in action for causing the switch 23 to be closed, after a predetermined period. Thus, some time after the P-wave signal has occurred, switch 23 will be closed and the signals from detector 15 will be transmitted to the filter 24 and attenuator 25 at the same time, as they are being transmitted over the direct path 21. Thus, the shape of the direct wave, e.g., wave 13 of Fig. 2, will be filtered and attenuated as desired to form an altered wave, e.g., wave 18, and then will be delivered to the input of the delay line 26.

By having delay line 26 adjustable, the delay period may be set to correspond to the time between the commencement of the direct wave and its following wave, e.g., waves 13 and 14, so that the filtered and attenuated wave (18) will be delivered to the point where the direct signals are combined with the delayed signals, at the proper time so as to cancel the direct wave (as indicated by the above description related to Fig. 2).

Then similarly in order to cancel the remaining wave, which is illustrated as wave 19 in Fig. 2; the output signals from delay line 26 are carried to the filter 34 and attenuator 35 to be delivered to the delay line 36. Here again the wave is shaped by the filter and attenuator to match the remaining wave that is to be canceled; and then delayed prior to mixing, as before, so that the newly created wave, e.g., wave 20, will combine in a canceling manner with wave $19^1$ (which was present on the path 32).

Thus the final result will be signals such as those illustrated by the trace $A+B+C$ of Fig. 2. This will exist on the path 38, and will be delivered to the recorder 39 for display.

It will be observed that the various elements of the block diagram shown in Fig. 3 might take widely different forms. It is contemplated that the delay lines 26 and 36 may be in the form of magnetic delay elements, since the period of delay involved would not be expected to be too great. The delay periods will vary, of course, depending upon the velocity of seismic wave propagation for a given detonation. In addition, the time would be dependent upon whether or not the method is carried out directly, as the signals are created by the detector 15 (from the detonation of a charge in the earth), or whether the signals to be operated upon, are those taken from a record previously made. For example, the signals might be those obtained by means of magnetic recording of the signals which were received when a charge was detonated. In the latter case the time delay involved must be varied depending upon the speed of play back used in reconstituting the signals as they exist on the magnetic record.

Likewise, time delay switch element 17 may take various forms among which are commercially available units. In addition the switch 23 might be any feasible type of electric circuit breaking structure; or it might take the form of an electronic switch wherein no mechanical moving parts are involved.

While a particular embodiment of the invention has been shown and described in considerable detail in accordance with the applicable statutes, this is not to be taken as in any way limiting the invention but merely as being descriptive thereof.

It is claimed:

In seismic exploration, a device for elimination of "ghost" waves comprising a transducer and a recorder, a first circuit means directly interconnecting said transducer and recorder, a second circuit means in shunt with said first circuit means having filter, attenuation and delay means therein, a switch means in said second circuit, and a time delay means operatively connected to said transducer and to said switch, whereby a signal from said transducer passes directly to said recorder and at a later time passes indirectly in modified form to said recorder to eliminate "ghost" waves.

References Cited in the file of this patent

UNITED STATES PATENTS

| | | |
|---|---|---|
| 2,693,862 | Rieber | Nov. 9, 1954 |
| 2,779,428 | Silverman | Jan. 29, 1957 |
| 2,882,988 | Dobrin | Apr. 21, 1959 |

OTHER REFERENCES

Van Melle et al.: "Ghost Reflections Caused by Energy Initially Reflected Above the Level of the Shot," Geophysics Magazine, October 1953, vol. 18, pages 793–804.